United States Patent Office 3,153,648
Patented Oct. 20, 1964

3,153,648
3-ACYLAMINO-6-SUBSTITUTED-1,2,4-TRIAZINE COMPOUNDS
Yutaka Kodama and Isamu Saikawa, Toyama-shi, and Masae Kanamori, Shimoniikawa-gun, Toyama-ken, Japan, assignors to Toyama Kagaku Kogyo Kabushiki Kaisha, Tokyo, Japan, a corporation of Japan
No Drawing. Filed Nov. 15, 1961, Ser. No. 152,636
Claims priority, application Japan July 17, 1961
9 Claims. (Cl. 260—240)

This invention relates to 3-acylamino-1,2,4-triazines of the formula:

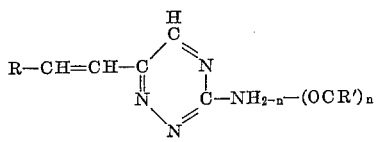

in which R is selected from the group consisting of nitrofuryl, nitrothienyl, nitrophenyl, R' is an organic radical linked to the carbonyl group by a carbon to carbon bond and $n$ is a positive integer less than 3. The invention includes processes of preparing the compounds.

In the copending application of Kodama, Takai, Saikawa, Maeda and Takamichi, Serial No. 152,632, filed November 15, 1961, there are described and claimed triazine compounds corresponding to the above formula in which the 3-amino group is unacylated.

Many of the compounds of the present invention have the unusual and unexpected property of remaining in the intestinal tract for prolonged periods sufficient to treat intestinal infections. This property is particularly marked in the acetyl derivatives. In addition, some of the compounds such as those having the hydroxyalkylaminoacyl groups exhibit a higher water solubility than the unacylated compounds and therefore lend themselves to aqueous solutions of higher concentrations.

The starting materials, that is to say the unacylated 3-amino triazines, are acylated under either mild or stronger acylating conditions. The reaction appears to proceed in steps, forming first the monoacyl compound and then on further reaction the diacyl compound.

Where an acylating agent is an anhydride, such as for example acetic anhydride, the anhydride alone is sufficient. Where, however, an acid halide is used as the acylating agent, it is necessary to provide an acid binding substance, such as pyridine, dimethylaniline, sodium acetate, sodium phosphate, etc. It is desirable to use a reaction medium involving an organic solvent for ease of reaction, although since the acylating agent is normally itself a liquid, it is possible to dispense with additional solvents and such processes are included within the scope of the present invention.

When the acyl group is to be further substituted it should contain a reactive group such as chlorine which can be reacted with other substances such as amines. Typical amines are the following: aniline, dichloroaniline, diethanol amine, cyclohexylamine, morpholine, diphenylamine, etc.

The invention will be described in greater detail in conjunction with the following specific examples in which the proportions are by weight unless otherwise specified.

Example 1

20 parts of bis-(5-nitrofurfurylidene)-acetone guanyl hydrazone are dissolved in 200 parts of dimethylformamide with stirring and 28 parts of sodium carbonate are then added which is far in excess of that sufficient to bring the pH above 4.0. The mixture is then heated at 120–130° C. until reaction is complete at which time the reaction mixture is strongly alkaline.

The reaction mixture is distilled under a vacuum to remove dimethyl formamide. The residue is then heated with 1,000 parts of acetone under reflux. The resulting solution is decolorized with carbon and subjected to hot filtration. After cooling the filtrate, the crystalline reddish-orange 3 - amino-6-(5'-nitrofurylethenyl)-1,2,4-triazine is separated by filtration.

Example 2

Two parts of bis-(5-nitrothenylidene)-acetone are suspended in 50 parts of acetonitrile and 1.35 parts of aminoguanidine hydrochloride are then gradually added; after the addition is complete the mixture is heated. The reaction proceeds smoothly and a reddish-orange hydrochloride of the corresponding guanyl hydrazone results. This compound melts at about 265° C. with decomposition. The yield is almost quantitative.

A mixture of 2 parts of bis-(5-nitrothenylidene)-acetone guanyl hydrazone, 0.25 part of sodium carbonate and 20 parts dimethylformamide is heated at 130° C. until completion of reaction. This reaction mixture is acidified with hydrochloric acid and diluted with 60 ml. of water. Black undissolved materials are removed by filtration. The filtrate is neutralized with liquid sodium carbonate whereby a reddish-orange base separates out. The base is recrystallized from acetone to yield a product decomposing at 286° C. Analyses correspond to those for 3-amino-6-(5'-nitrothienylethenyl)-1,2,4-triazine.

Example 3

Five parts of bis-(p-nitrobenzylidene)-acetone is suspended in 150 parts of dioxane and 3 parts of aminoguanidine hydrochloride in hot aqueous solution are gradually added. The reaction mixture gradually turns from yellow to yellowish orange and it is heated at the reflux until the reaction is complete, whereupon the mixture is allowed to cool and a precipitate which forms is filtered off. It constitutes bis-(p-nitrobenzylidene)-acetone guanyl hydrazone hydrochloride, which decomposes at approximately 285° C. The yield is very high.

A mixture of 25 parts of bis-(p-nitrobenzylidene)-acetone guanyl hydrazone hydrochloride, 0.65 part of sodium bicarbonate and 20 parts of dimethylformamide is heated at 130° C. until completion of reaction. The reaction mixture is diluted with 50 ml. of water and then acidified with HCl. Thereafter, this mixture is filtered and the filtrate is made alkaline with ammonia. A precipitate forms and it is separated by filtration. The solid is washed with methanol and ether to remove the p-nitrotoluene which is a by-product. The residue is recrystallized from dimethylformamide to yield yellow-orange needles decomposing at 305° C. Elemental analysis correspond to those for 3-amino-6-(p-nitrostyryl)-1,2,4-triazine.

Example 4

One part of the product of Example 1, 3-amino-6-(5'-nitrofurylethenyl)-1,2,4-triazine, is dissolved in 10 parts of dimethylformamide and 11.5 parts of acetic anhydride are added to the resulting solution. The mixture is heated to 100° C. until the monoacetyl derivative appears as yellow crystalline needles. The product is collected by filtration, washed with acetone and with water and constitutes a compound which decomposes at about 284° C.

One part of the monoacetyl derivative is refluxed with 15 parts of acetic anhydride until it completely dissolves. On cooling the resulting solution, yellow crystalline needles like compound appear which is the diacetyl derivative. This compound melts at approximately 205° C.

Example 5

Two parts of 3-amino-6-(5'-nitrothienylethenyl)-1,2,4-triazine, 3 parts of acetic anhydride and 30 parts of dimethylformamide are heated at 100° C. until solution is complete. The mixture is then permitted to cool and yellow crystalline needles appear. They are recovered by filtration and washed well with acetone. A product is obtained which analyzes as the diacetyl compound. It composes at about 291° C.

*Example 6*

One part of 3-amino-6-(p-nitrostyryl)-1,2,4-triazine, 0.35 part acetyl chloride, 0.36 part sodium acetate and 15 parts of dimethylformamide are heated at 100° C. On cooling, pale yellow colored crystalline monoacetyl derivative separates out as needles and shows a decomposition point of about 288° C. The monoacetyl derivative obtained is then dissolved in 20 times its weight of acetic anhydride by heating at the reflux. After solution is complete, it is allowed to cool and yellow crystalline needles separate out which analyze as the diacetyl compound which decomposes at approximately 260° C.

*Example 7*

For the preparation of 3-morpholinoacetylamino-6-(5'-nitrofurylethenyl)-1,2,4-triazine hydrochloride, 0.5 part of 3-monochloroacetylamino-6-(5'-nitrofurylethenyl)-1,2,4-triazine is suspended in 4 cc. of dimethylformamide. To the resulting suspension, an acetone solution of 0.14 part morpholine is added, whereupon it dissolves to provide a clear solution. After a short while, yellow crystalline needles appear from the solution.

The crystalline product is collected by filtration and then washed well with acetone. The desired material, appearing as yellow needles, decomposing at 170–172° C., is obtained.

*Example 8*

For the preparation of 3-(3,4-dichlorophenylaminoacetylamino)-6-(5'-nitrofurylethenyl)-1,2,4-triazine hydrochloride, one part of 3-monochloroacetylamino-6-(5'-nitrofurylethenyl)-1,2,4-triazine is suspended in 6 cc. of dimethylformamide, and to the suspension, 0.52 part of 3,4-dichloroaniline is added. Heating effects dissolution. After allowing the resulting solution to cool, yellow crystalline needles gradually appear.

The crystalline product is collected by filtration and then washed well with acetone. The desired material, appearing as yellow needles, decomposing at 208° C., is obtained.

*Example 9*

For the preparation of 3-piperidinoacetylamino-6-(5'-nitrofurylethenyl)-1,2,4-triazine hydrochloride, 0.5 part of 3-monochloroacetylamino-6-(5'-nitrofurylethenyl)-1,2,4-triazine and 0.16 cc. of piperidine are mixed in ethylene glycol monomethyl ether. After rapid dissolution, a crystalline mass gradually appears from the resulting solution.

The crystalline product is collected by filtration and then washed well with acetone, 0.5 part of desired material, appearing as yellow needles, decomposing at 145° C., is obtained.

*Example 10*

To a solution of 3.0 parts of 3-amino-6-(5'-nitrofurylethenyl)-1,2,4-triazine in 30 parts of dimethylformamide are added 2.5 parts of monochloroacetic anhydride. The mixture is heated and from the reaction mixture 3-monochloroacetylamino-6-(5'-nitrofurylethenyl)-1,2,4-triazine is obtained as yellow needles, decomposing at 194–198° C.

*Example 11*

2.4 parts of 3-amino-6-(5'-nitrofurylethenyl)-1,2,4-triazine are dissolved in 25 parts of dimethylformamide, and to this are added 2.5 parts of benzoic anhydride. The mixture is heated at 100° C. for one hour. The separated yellow crystalline needles are recrystallized from dimethylformamide, they decompose at 243° C. and correspond to 3-benzoylamino-6-(5'-nitrofurylethenyl)-1,2,4-triazine.

*Example 12*

One part of 3-amino-6-(5'-nitrofurylethenyl)-1,2,4-triazine is dissolved in 10 parts of dimethylformamide and to this are added 15 parts of propionic anhydride. The mixture is heated at 100° C. for one hour, whereby the monopropionyl derivative appears as yellow crystalline needles. After recrystallization this 3-monopropionylamino-6-(5'-nitrofurylethenyl)-1,2,4-triazine decomposes at 266° C.

We claim:

1. A compound of the formula:

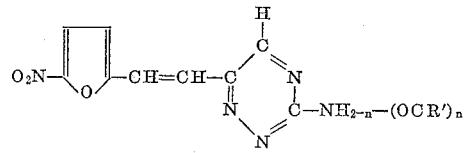

in which R is a radical selected from the group consisting of lower alkyl and phenyl and $n$ is a positive integer less than 3.

2. A compound of the formula:

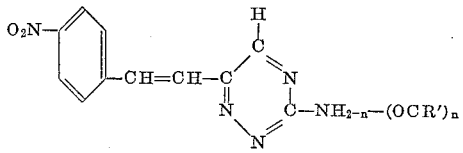

in which R is a radical selected from the group consisting of lower alkyl and phenyl and $n$ is a positive integer less than 3.

3. A compound of the formula:

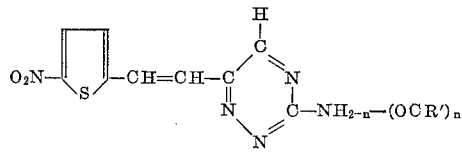

in which R is a radical selected from the group consisting of lower alkyl and phenyl and $n$ is a positive integer less than 3.

4. A compound of the formula:

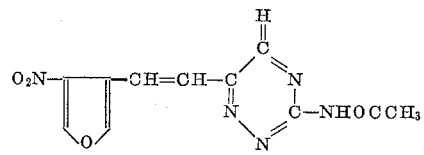

5.

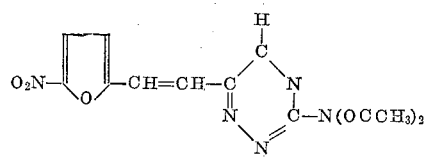

6.

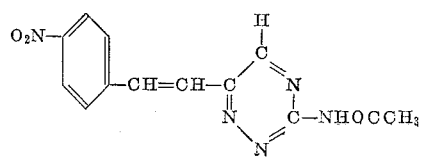

7. 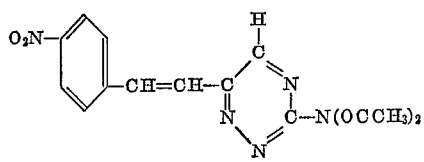
8. 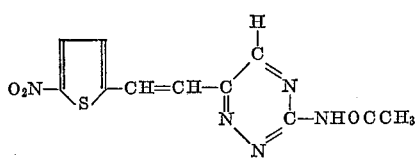
9. 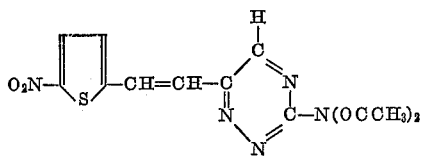
References Cited in the file of this patent
Erickson et al.: "The 1,2,3- and 1,2,4-Triazines, Tetrazines and Pentazines," Interscience Pub. Inc., N.Y., 1956. Pages 55 and 56.
Miura et al.: "Journ. Pharm. Soc., Japan," vol. 81, No. 9, pages 1357–60.
Dann et al.: "Chemische Berichte," vol. 82, pages 81–88 (1949).